Aug. 31, 1926.
J. F. MONTINE
1,598,215
DRIVE WHEEL
Filed May 31, 1923
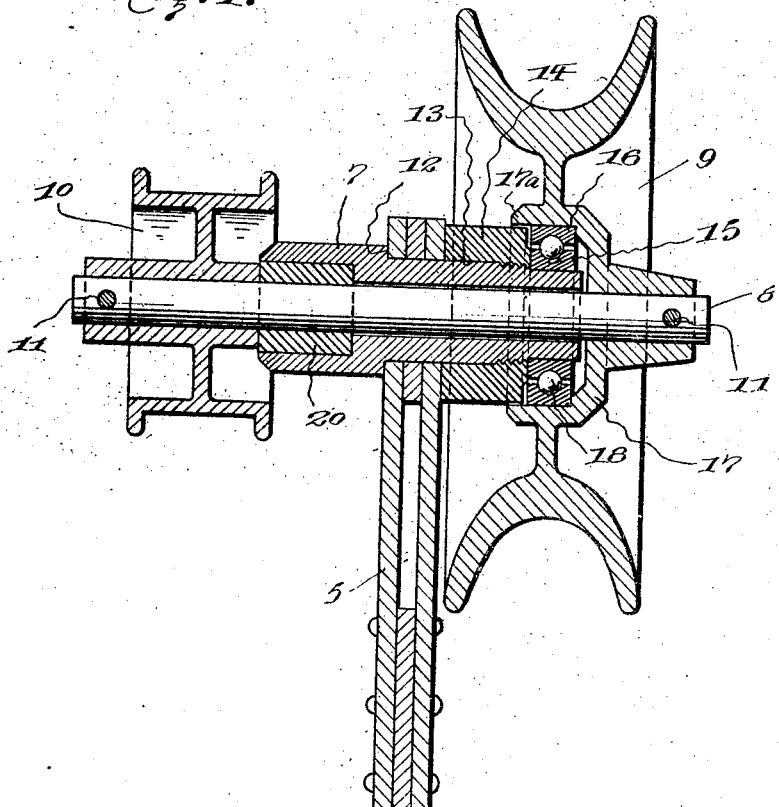
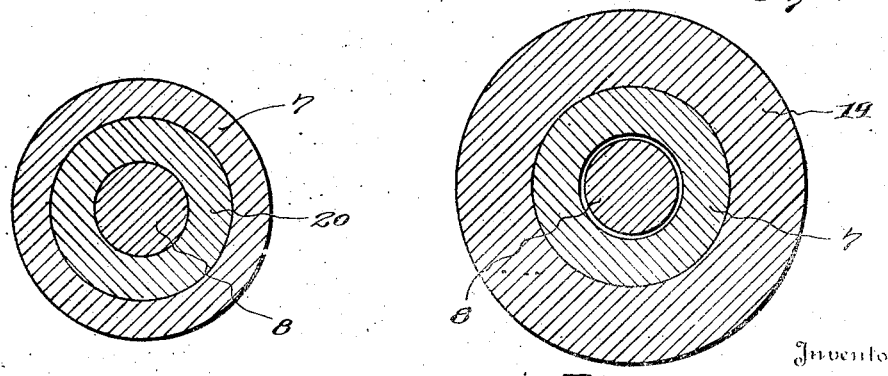
Inventor:
J. F. Montine.
By Milo B. Stevens Co.
Attorneys.

Patented Aug. 31, 1926.

1,598,215

UNITED STATES PATENT OFFICE.

JOSEPH F. MONTINE, OF CHICAGO, ILLINOIS.

DRIVE WHEEL.

Application filed May 31, 1923. Serial No. 642,639.

My invention relates to pulley driven traction wheels and more particularly to such as are especially adapted for use in connection with aerial tramways although not necessarily restricted to such use, the primary object of the invention being to provide a strong and durable bearing construction whereby a drive pulley and traction wheel may be axially aligned in spaced relation.

The invention has for an important object the provision of a device of the character set forth which may be quickly applied or detached from a truck and wherein a novel improved means is employed for maintaining the device in operative position.

A further object of the invention resides in certain improved details of construction whereby the pulley and traction wheels may be removed from their bearings without removing the associated parts from the truck.

A still further object of the invention is to provide a novel and improved journal bearing for the traction wheel drive shaft.

Other objects and advantages will become apparent during the course of the detailed description appearing hereinafter, and in order that the same may be better understood, reference is had to the accompanying drawings forming a part of this specification.

In the drawings:—

Figure 1 is a sectional elevation of a pulley driven traction wheel and journal bearing constructed in accordance with my invention;

Fig. 2 is a cross-section through the drive shaft and associated elements adjacent the traction wheel, and Fig. 3 is a similar view taken adjacent the pulley.

Referring specifically to the drawings, wherein the preferred embodiment of the invention is disclosed for the purpose of illustration, and in which like reference characters have been used throughout to designate like parts, numeral 5 denotes a portion of the frame of an aerial tramway truck, which latter is provided with a lateral projection 6 whereby a receptacle may be attached to the truck together with a suitable housing for a motor for the transmission of power to a traction wheel.

The upper portion of the truck frame 5 is provided with an opening for the reception of a journal bearing 7, which carries an axle 8 to one end of which is keyed or otherwise secured a traction wheel 9, while at the other end a pulley wheel 10 is rigidly attached. In the drawings I have shown the traction wheel 9 and the pulley wheel 10 as being attached to the axle by means of transverse pins 11 extending through the hubs thereof.

The bearing 7 is provided adjacent the pulley end with a shoulder 12 which is adapted to abut against the frame of the truck to limit the insertion of the bearing into the opening thereof. The portion of the bearing 7 inserted into the opening in the frame 5 is circumferentially reduced, as shown at 13, being threaded intermediate its ends for the reception of a sleeve 14, the rear end of which is adapted for threaded-engagement with the threads of the bearing whereby the bearing 7 may be rigidly clamped to the frame 5, it being apparent that the sleeve 14 and the shoulder 12 will co-operate to prevent any looseness of the bearing. The sleeve 14 may be formed with a square or hexagonal portion at its exterior for the application of a wrench for tightening the same.

The free end of the bearing projecting beyond the sleeve 14 is encircled by a suitable ring 15 having a medial circumferential groove, which with a similar ring 16 rigidly carried within the hub 17 of the traction wheel serves to provide a raceway for ball bearings 18. From the foregoing it will be evident that a very efficient bearing has been provided for reducing the friction of the traction wheel 9. The circumferential inner projection 17$^a$ of the hub 17 extends beyond the edge of the sleeve 14 while the bearing ring 16 within the hub is adjacent the outer edge of the sleeve 14 thus effectually preventing the entry of grit or foreign matter into the bearing. Should it be found desirable, the ring 15 may be formed integrally with the sleeve 14.

The pulley end of the journal bearing 7 is provided with a circumferential interior recess to receive a bushing 20 of suitable bearing material which serves to prevent wear upon the bore of the bearing. The inner circumferential edge of the hub of the pulley is axially aligned with the bushing 20 so as to prevent any wear upon the end of the journal bearing.

From the foregoing description the novel features of my invention will be readily apparent, and while I have illustrated the preferred embodiment of the invention in concrete form in accordance with the patent statutes, yet it will be distinctly understood that I do not propose to limit myself strictly thereto since various changes and modifications will immediately suggest themselves to those skilled in the art without departing from the spirit of my invention the scope of which is defined by the following claims.

I claim:

1. The combination with a support, of a journal bearing mounted thereon, a nut threaded on the bearing to hold the same in place, a power transmitting member having a hub, an anti-friction member mounted on said bearing and confined within said hub, said hub being provided with a lateral annular extension surrounding said nut and thereby forming a means to exclude dust from said anti-friction member.

2. In a device of the character described, a journal bearing having a shaft extending therethrough, an exterior abutment carried by said journal bearing, clamping means for maintaining said abutment against a support, antifriction bearings for said shaft associated with said journal bearing, one of said antifriction bearings being formed exteriorly of said journal bearing, and a driven element carried by said shaft and rotatable upon said last mentioned bearing.

3. In a device of the character described, a journal bearing having a shaft extending therethrough, an exterior abutment formed upon such bearing at a medial point, a support received by the bearing next to the abutment, a sleeve threaded on the bearing to clamp the latter and form an abutment for the inner race of an antifriction bearing, and a driven element carried by the shaft and forming the outer portion of such antifriction bearing.

4. The combination with a support, of a journal bearing mounted thereon, and having a shoulder engaging said support, a nut threaded on said bearing and cooperating with said shoulder to hold the bearing in place, a power transmitting member having a hub, an anti-friction member mounted on said bearing and confined within said hub, said hub being provided with a lateral annular extension surrounding said nut and thereby forming a means to exclude dust from said anti-friction member, and a shaft extending through said journal bearing and having connection with said hub.

In testimony whereof I affix my signature.

JOSEPH F. MONTINE.